Patented July 28, 1925.

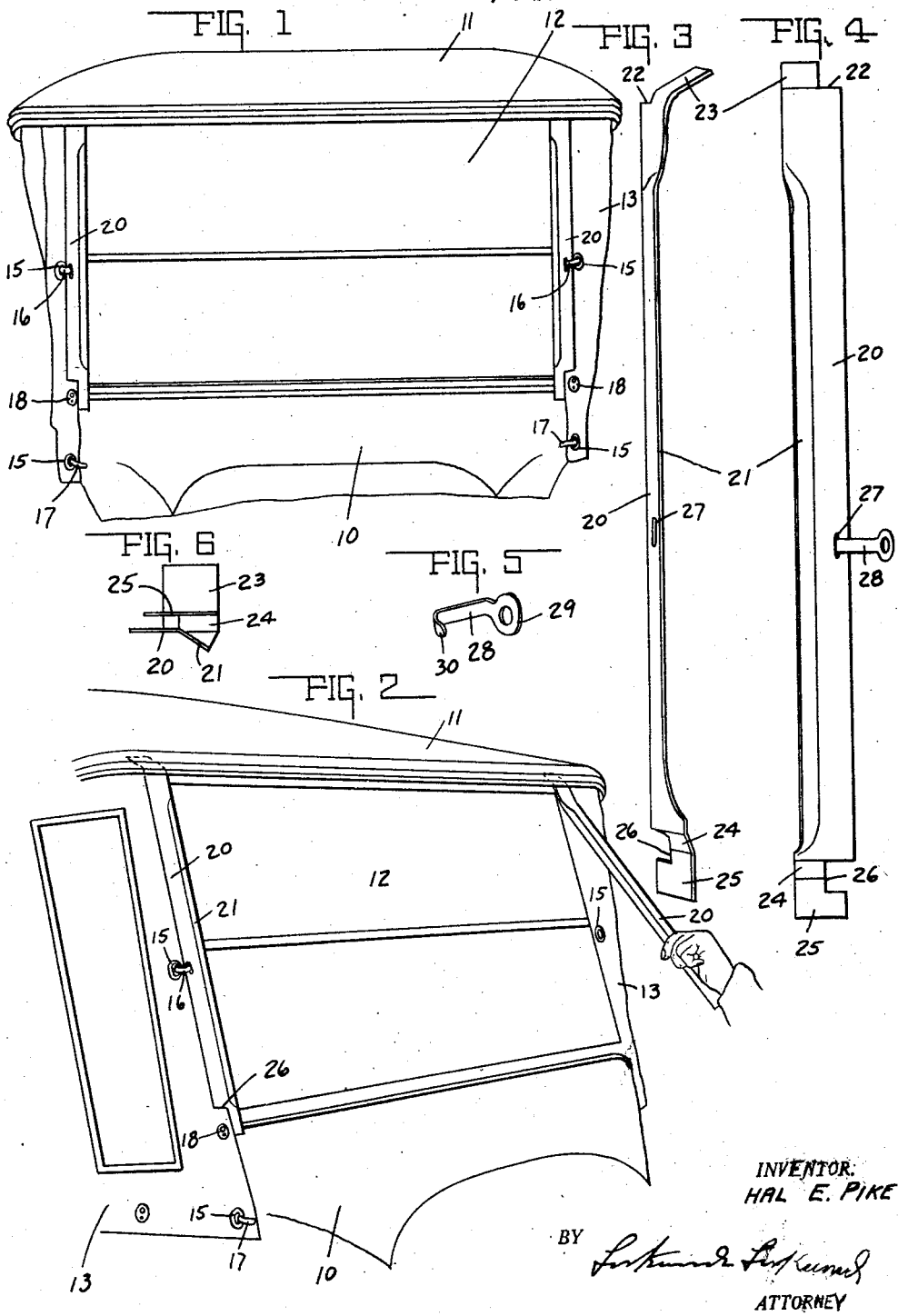

1,547,234

UNITED STATES PATENT OFFICE.

HAL E. PIKE, OF RUSHVILLE, INDIANA.

WEATHER STRIP FOR WINDSHIELDS AND CURTAINS OF VEHICLES.

Application filed January 9, 1924. Serial No. 685,134.

*To all whom it may concern:*

Be it known that I, HAL E. PIKE, a citizen of the United States, and a resident of Rushville, county of Rush, and State of Indiana, have invented a certain new and useful Weather Strip for Windshields and Curtains of Vehicles; and I do hereby declare that the following is a full, clear, and exact description thereof, reference being had to the accompanying drawings, in which like numerals refer to like parts.

This invention relates to an attachment for interposition between a windshield and a side curtain and constitutes a rain and wind deflecting member.

The chief object of this invention is to provide a clamping strip which is of simple as well as artistic construction and which can be attached in position adjacent the windshield and the side curtain at the connection therebetween with a minimum of effort, and which attachment can be as readily removed and stored with the side curtains when it is not desired to use side curtains. Herein the invention is illustrated as associated with an open car model of the Ford type of automobile, although the invention is not necessarily restricted thereto in its broader phases.

The chief feature of the invention consists in the formation of an attachable member, whereby it can be readily attached to and detached from association with the windshield and side curtain.

The full nature of the invention will be understood from the accompanying drawings and the following description and claims:

In the drawings, Fig. 1 is a front elevational view of a portion of a vehicle of the open car type showing a portion of the side curtains attached to the windshield and with a pair of complementary attachments embodying the invention associated therewith. Fig. 2 is a perspective view of the same and illustrates one of the attachments in position and the other attachment partially positioned. Fig. 3 is an enlarged perspective view of the attachment. Fig. 4 is a side view of the same. Fig. 5 is a perspective view of the clip or clamp associated with the attachment. Fig. 6 is an end view of the attachment.

In the drawings 10 indicates a motor vehicle having a top 11, windshield 12 and side curtains 13. The side curtain 13 is secured to the motor vehicle and to the windshield support by the eyelets 15 and the snap springs 16 and 17 associated with said eyelets respectively. Another snap construction 18 is also interposed between the foregoing and serves to secure said curtain to the vehicle. Other connections are also provided but they are not herein utilized. As shown clearly in Figs. 3 and 4 and 6, the attachment consists of an elongated strip 20 having along one edge a depressed or recessed portion 21. The upper end of the strip 20 is laterally notched at 22 for clearance purposes and upon the opposite side from the depressed or crimped portion. The free end of said strip is bent angularly at 23. The opposite end of the strip is offset with an angular portion 24 which extends in a similar direction from the strip as the end 23. The free end of said extension extends angularly of said extension 24 and may be said to extend approximately parallel to the main body of the strip. Herein said extensions 24 and 25 are notched laterally as at 26, and said notch 26 is positioned upon the same side as the notch 22 and is positioned oppositely from the recessed portion of the body 20. Intermediate the ends of the strip and in the main body portion 20 there is provided an elongated opening 27 which is adapted to receive a snap hook 28 having an eyelet portion 29 and the point portion 30.

Reference will now be had to Figs. 1 and 2. It will be noted, see the dotted upper portion of the left hand strip 20 of Fig. 2, that the angular extension 23 is positioned between the top 11 and the frame of the windshield and is anchored thereby. The cut away or laterally notched portion 22 is provided to clear an obstruction positioned at its point in the Ford type of automobile. After positioning the same as shown which is also illustrated in the right hand strip 20, see Fig. 2, the strip is superimposed upon the curtain 13 which has been previously secured in position adjacent to and supported by the windshield and other parts of the vehicle. The notched portion 26 permits the curtain 13 to pass through the same and overlie the lateral projecting portion of the projection 25, as shown clearly in Figs. 1 and 2. Thus the curtain by reason of the snap or detachable connection 18 is adapted to anchor the lower end of the attachment in place, while the upper end is secured as aforesaid. The projection 25 is thus positioned between the windshield and windshield body bracket and thus anchors the attachment to the vehicle body.

All of the foregoing, however, does not prevent lateral movement of the attachment with respect to the windshield and the following means prevents such movement. The snap spring hook 16, see 28 Fig. 5, found upon the Ford automobile after passing through the eyelet 15 is indicated generally in Figs. 1 and 2 by the numeral 16 which extends toward the center of the windshield. The inner end of said hook, see that portion indicated by the numeral 30 in Fig. 5 is bent angularly, and, therefore, passes rearwardly through the elongated opening 27 to anchor the attachment and prevent lateral movement thereof toward the center of the windshield. The attachment when thus positioned is not only adapted to prevent the passage of rain between the side curtains and the windshield, but also prevent the passage of wind therebetween. If desired a suitable cushion means, such as felt and the like, may be suitably secured to the depressed portion 21 and thus form a tighter joint with the windshield.

While the invention has been described in great detail in the foregoing specifications, the same is to be considered as illustrative and not restrictive in character, for many modifications will readily occur to those skilled in the art, and these modifications are all considered to be within the purview of the invention, reference being had particularly to the appended claims.

The invention claimed is:

1. An integral relatively rigid weather strip for an open car type of vehicle having a top, a wind shield and a side curtain, said strip comprising an angularly disposed end extending between the vehicle top and the top of the windshield and simultaneously bearing on both for anchorage, and a notched opposite end having one portion over-lying the side curtain and an adjacent portion under-lying the same for anchorage.

2. A device of the character defined by claim 1, characterized by the strip including an opening intermediate its ends for receiving the side curtain anchorage associated with the windshield intermediate the top and bottom of the shield.

In witness whereof, I have hereunto affixed my signature.

HAL E. PIKE.